United States Patent
Kuriyama

(10) Patent No.: US 8,629,914 B2
(45) Date of Patent: Jan. 14, 2014

(54) IMAGING DEVICE THAT CREATES MOVIE IMAGE DATA WITH CHANGING FOCUS POSITION

(75) Inventor: Takashi Kuriyama, Yokohama (JP)

(73) Assignee: Nikon Corporation, Tokyo (JP)

( * ) Notice: Subject to any disclaimer, the term of this patent is extended or adjusted under 35 U.S.C. 154(b) by 433 days.

(21) Appl. No.: 12/896,069

(22) Filed: Oct. 1, 2010

(65) Prior Publication Data

US 2011/0141334 A1    Jun. 16, 2011

(30) Foreign Application Priority Data

Oct. 9, 2009 (JP) ................................ 2009-234862
Sep. 2, 2010 (JP) ................................ 2010-196354

(51) Int. Cl.
*H04N 5/228* (2006.01)
*H04N 5/262* (2006.01)

(52) U.S. Cl.
USPC .................. 348/222.1; 348/239; 348/333.03; 348/346

(58) Field of Classification Search
USPC ............................................. 348/222.1, 239
See application file for complete search history.

(56) References Cited

U.S. PATENT DOCUMENTS

| | | | |
|---|---|---|---|
| 6,587,119 B1 * | 7/2003 | Anderson et al. | 345/672 |
| 7,692,714 B2 * | 4/2010 | Ohnishi | 348/350 |
| 7,855,737 B2 * | 12/2010 | Petrescu et al. | 348/239 |
| 8,416,310 B2 * | 4/2013 | Kuriyama | 348/220.1 |

FOREIGN PATENT DOCUMENTS

| | | |
|---|---|---|
| JP | A-61-084168 | 4/1986 |
| JP | B2-2702968 | 10/1997 |
| JP | A-2002-139665 | 5/2002 |
| JP | A-2002-290831 | 10/2002 |
| JP | A-2009-089144 | 4/2009 |

OTHER PUBLICATIONS

Aug. 2, 2011 Office Action issued in Japanese Patent Application No. 2010-196354 (with translation).

* cited by examiner

*Primary Examiner* — Ngoc-Yen Vu
(74) *Attorney, Agent, or Firm* — Oliff & Berridge, PLC

(57) ABSTRACT

Provided are: an imaging sensor that captures subject light via a photographic optical system having a focusing lens; a display unit that displays a through image based upon an imaging signal from the imaging sensor; an area setting unit that sets at least two areas on the through image displayed on a display surface of the display unit; a movement control unit that adjusts a focus position to a subject in one area of the at least two areas set by the area setting unit and moves the focus position from the subject in the one area to a subject in the other area, which is different from the one area, of the at least two areas over a predetermined time by controlling drive of the focusing lens; and a movie image data creation unit that creates movie image data, which includes a movie image having the focus position moved from the subject in the one area to the subject in the other area by the movement control unit, based upon the imaging signal from the imaging sensor.

8 Claims, 17 Drawing Sheets

US 8,629,914 B2

IMAGING DEVICE THAT CREATES MOVIE IMAGE DATA WITH CHANGING FOCUS POSITION

CROSS-REFERENCE TO RELATED APPLICATIONS

The disclosures of the following priority applications are incorporated herein by reference:
Japanese Patent Application No. 2009-234862 filed on Oct. 9, 2009; and
Japanese Patent Application No. 2010-196354 filed on Sep. 2, 2010.

TECHNICAL FIELD

The present invention relates to an imaging device capable of recording a movie image.

BACKGROUND ART

There has been proposed an image processing device that acquires a near-scene focused image and a far-scene focused image shot by a digital camera and having mutually different focus positions, adjusts the defocusing states of the acquired near-scene focused image and far-scene focused image, creates a plurality of focus varying images, which gradually change from the focus position of the near-scene focused image to the focus position of the far-scene focused image, based upon the adjustment of the defocusing states, and creates an image file of a movie image by connecting the near-scene focused image, the plurality of focusing change images and the far-scene focused image as respective frames (for example, see Patent Literature 1).

CITATION LIST

Patent Literature

Patent Literature 1: Japanese Patent Laid-open Application Publication No. 2002-290831

SUMMARY OF INVENTION

Technical Problem

However, in order to produce a movie image file according to the above-described conventional technology, since it is necessary to produce respective frames constituting the movie image file by synthesizing two images and an image synthesis processing function needs to be provided, the configuration of the image processing device is complicated, resulting in the increase in cost. Meanwhile, in the case of shooting a movie image, there is an increased demand for a technology capable of acquiring a movie image having an impressive video effect, such as a movie image having a focus position gradually changing from a near scene to a far scene, without performing the above-described synthesis processing. However, a high level of operational skill is required when a user attempts to shoot a movie image having an impressive video effect such as described above by way of manually operating a video camera or the like.

An object of the present invention is to provide an imaging device capable of easily creating movie image data including a movie image having an impressive video effect.

Solution to Problem

An imaging device of the present invention comprises: an imaging sensor that captures subject light via a photographic optical system having a focusing lens; a display unit that displays a through image based upon an imaging signal from the imaging sensor; an area setting unit that sets at least two areas on the through image displayed on a display surface of the display unit; a movement control unit that adjusts a focus position to a subject in one area of the at least two areas set by the area setting unit and moves the focus position from the subject in the one area to a subject in the other area, which is different from the one area, of the at least two areas over a predetermined time by controlling drive of the focusing lens; and a movie image data creation unit that creates movie image data which includes a movie image having the focus position moved fruit the subject in the one area to the subject in the other area by the movement control unit, based upon the imaging signal from the imaging sensor.

Advantageous Effects of Invention

According to the imaging device of the present invention, it is possible to easily create movie image data including a movie image having an impressive video effect.

DESCRIPTION OF EMBODIMENTS

Figure 1:
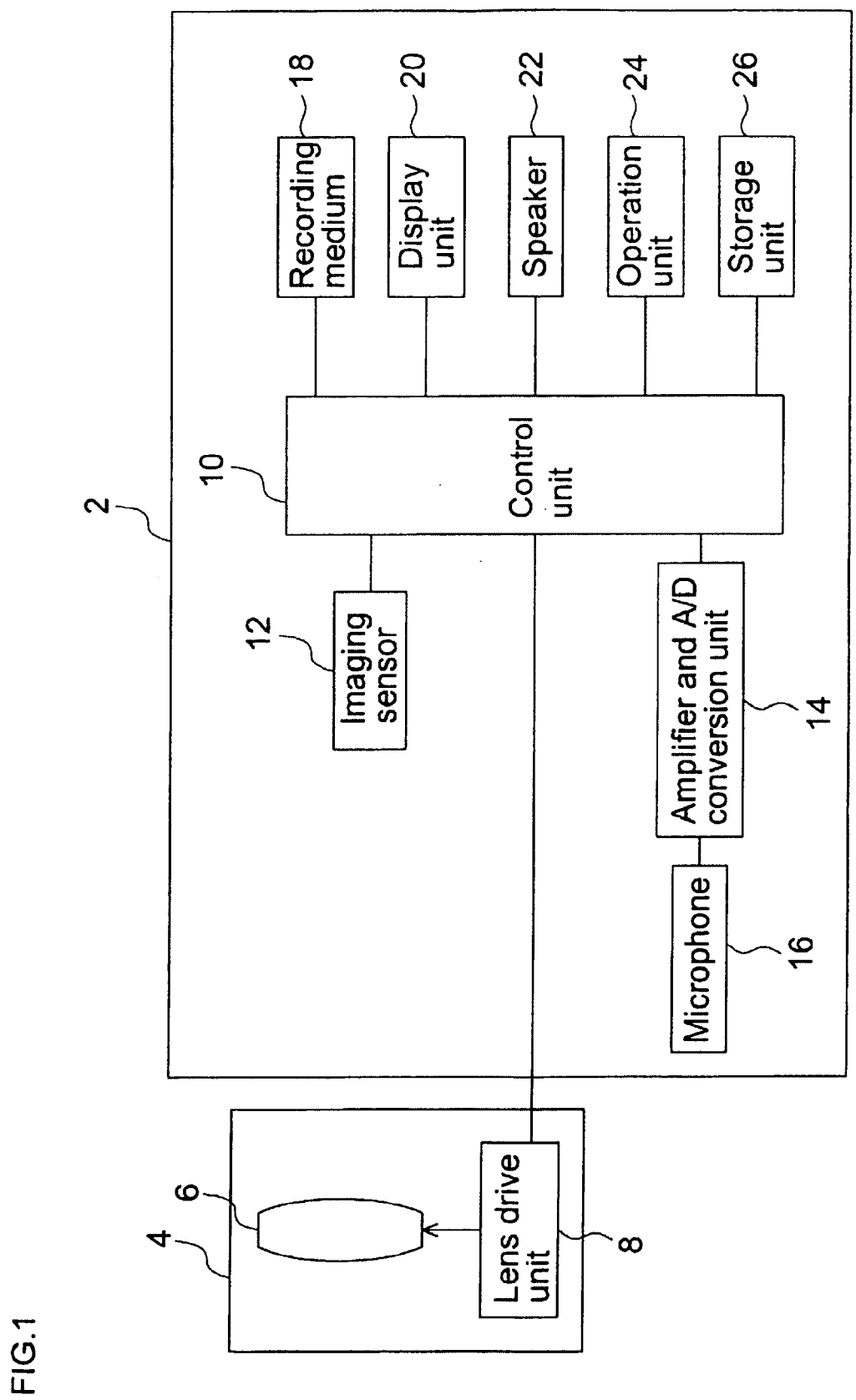
FIG. 1 is a block diagram showing the system configuration of an electronic camera according to an embodiment.

Hereinafter, with reference to the drawings, an electronic camera will be described as an imaging device according to a first embodiment of the present invention. FIG. 1 is a block diagram showing the system configuration of an electronic camera 2 according to the first embodiment. As shown in FIG. 1, the electronic camera 2 is provided with a photographic lens 4 including a focusing lens 6, a lens drive unit 8 for driving the focusing lens 6 in an optical axis direction and the like. The lens drive unit 8 drives the focusing lens 6 under the control of the electronic camera 2 (a control unit 10 which will be described later). It is to be noted that in this embodiment, an interchangeable lens type electronic camera in which the photographic lens 4 is detachably mounted on the electronic camera 2 will be described as an example. However, an electronic camera having an integrated lens may also be employed. Moreover, in this embodiment, an electronic camera capable of shooting a still image and a movie image is given as an example, but this may be an electronic camera that is only capable of shooting a movie image.

The electronic camera 2 includes a control unit 10, which is constituted with a microprocessor and the like, for performing unified control of the various parts of the electronic camera 2. The control unit 10 is connected to an imaging sensor 12, an amplifier and A/D conversion unit 14, a recording medium 18, a display unit 20, a speaker 22, an operation unit 24 and a storage unit 26. The imaging sensor 12 is constituted with a CCD, a CMOS and the like, captures subject light via the photographic lens 4 so as to output an imaging signal to the control unit 10. The control unit 10 converts the imaging signal, which is received from the imaging sensor 12, from an analog signal to a digital signal, and creates image data from the digital signal. A CMOS type imaging sensor may directly output the digital signal. Furthermore, the control unit 10 detects a contrast value of the created image data, and performs contrast-system auto-focusing based upon the detected contrast value. Specifically, the control unit 10 adjusts a focus position by moving the focusing lens 6 in an optical axis direction via the lens drive unit 8.

The amplifier and A/D conversion unit 14 converts an analog signal of the audio in the vicinity of the electronic camera 2, which is collected by a microphone 16, into a digital signal, and outputs the converted digital audio signal to the control unit 10. The control unit 10 creates audio data from the digital audio signal output from the amplifier and A/D conversion unit 14. The recording medium 18 is a portable recording medium detachably provided in a card slot (not shown) arranged to the electronic camera 2, and uses a CF card, an SD card, and a smart media, for example. The recording medium 18 records the image data, the audio data and the like created in the control unit 10.

The display unit 20 is constituted with a monitor, for example, configured by an LCD provided on the rear surface of the electronic camera 2 or an EVF, for example, configured by an LCD provided on the rear surface of the electronic camera 2. The display unit 20 displays a through image based upon the imaging signal from the imaging sensor 12, a still image and a movie image based upon the image data recorded on the recording medium 18, a sample movie image stored in a memory (not shown) in the electronic camera 2 as sample movie image data for each scenario movie image shooting mode which will be described later, information regarding shooting and the like. The speaker 22 outputs audio based upon the audio data recorded on the recording medium 18, or based upon audio data recorded in a memory (not shown) in association with the sample movie image data stored in the memory (not shown) in the above-described electronic camera 2.

The operation unit 24 includes a power switch for turning on/off the power of the electronic camera 2, a recording start button (for example, a REC button and a shutter button) operated when starting to record a movie image and audio, a recording end button (for example, a REC button and a shutter button) operated when completing recording the movie image and audio, a menu button for displaying a menu and the like on the display unit 20, a cross key operated at the time of the selection of menu items and the like and at the time of various settings, a decision button (an OK button) for performing a determination operation for the selection of the menu items and the like and the various settings. The storage unit 26 stores a position and the like of a focus point and the like (which will be described later) relative to a display surface, which is set for the through image displayed on the display surface of the display unit 20.

In the electronic camera 2 according to this embodiment, the drive of the focusing lens 6 is controlled by the control unit 10, so that a movie image having a focus position gradually changing from a near subject to a far subject can be automatically shot. Hereinafter, with reference to a flowchart shown in FIG. 2, description is given of the processing when the above-described movie image is shot in the electronic camera 2 according to the first embodiment.

Figure 3:
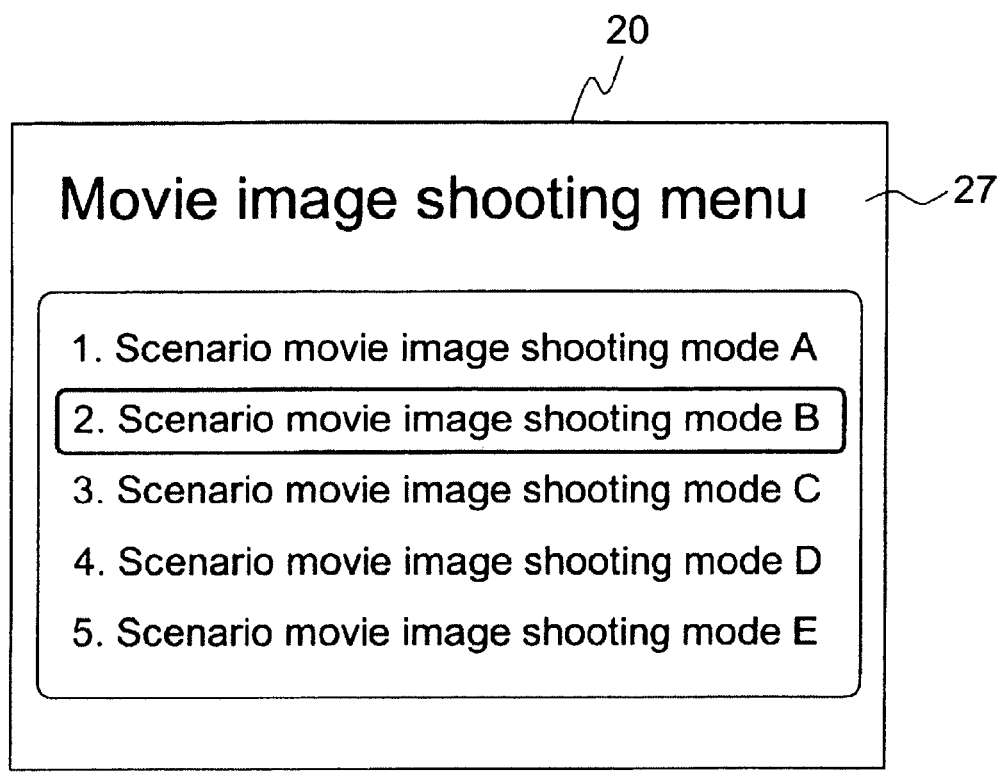
FIG. 3 is a diagram showing a display example of a display unit according to the embodiment.

First, if a user gives an instruction for displaying a movie image shooting menu (e.g., pressing of a menu button), the control unit 10 displays a movie image shooting menu screen 27, for example as shown in FIG. 3, on the display unit 20. Items that allow for selecting various movie image shooting modes (in FIG. 3, scenario movie image shooting modes A, B, C, D, and E) are displayed on the movie image shooting menu screen 27. If a user selects one movie image shooting mode (the scenario movie image shooting mode B in FIG. 3) using the cross key and the like and presses the OK button, the control unit 10 displays a screen 28, for example shown in FIG. 4, on the display unit 20. A message such as "Display sample movie image?" and items serving to select an answer to the message (in FIG. 4, "Yes" and "No") are displayed on the screen 28.

It is to be noted that according to this embodiment, in the scenario movie image shooting mode B, a movie image which is reproduced while the focusing is changed to a different area (e.g., from a near subject to a far subject) in a shooting screen is shot. Furthermore, the sample movie image is a movie image, which is created in advance for each scenario movie image shooting mode, which serves to accurately present to the user the characteristic video effect for each of these scenario movie image shooting modes, and which is stored in a memory (not shown) in the electronic camera 2; by way of viewing the sample movie image, the user can easily understand the format (mode) of the movie image that can be shot with the selected scenario movie image shooting mode.

Figure 4:
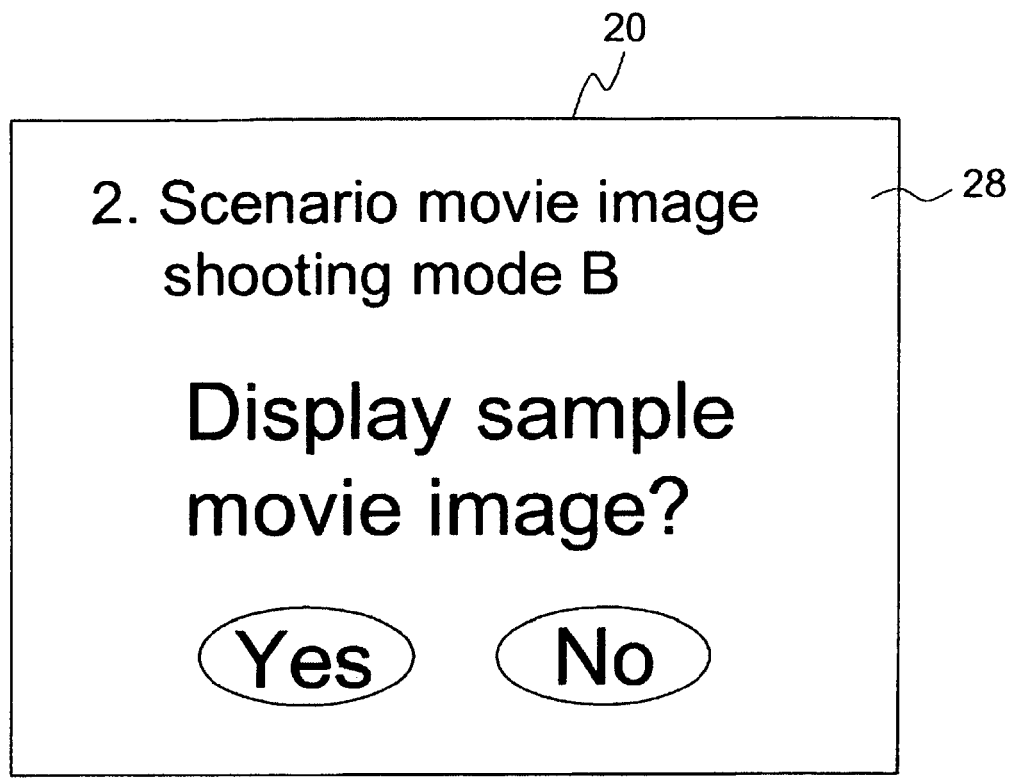
FIG. 4 is a diagram showing a display example of the display unit according to the embodiment.
Figure 5:
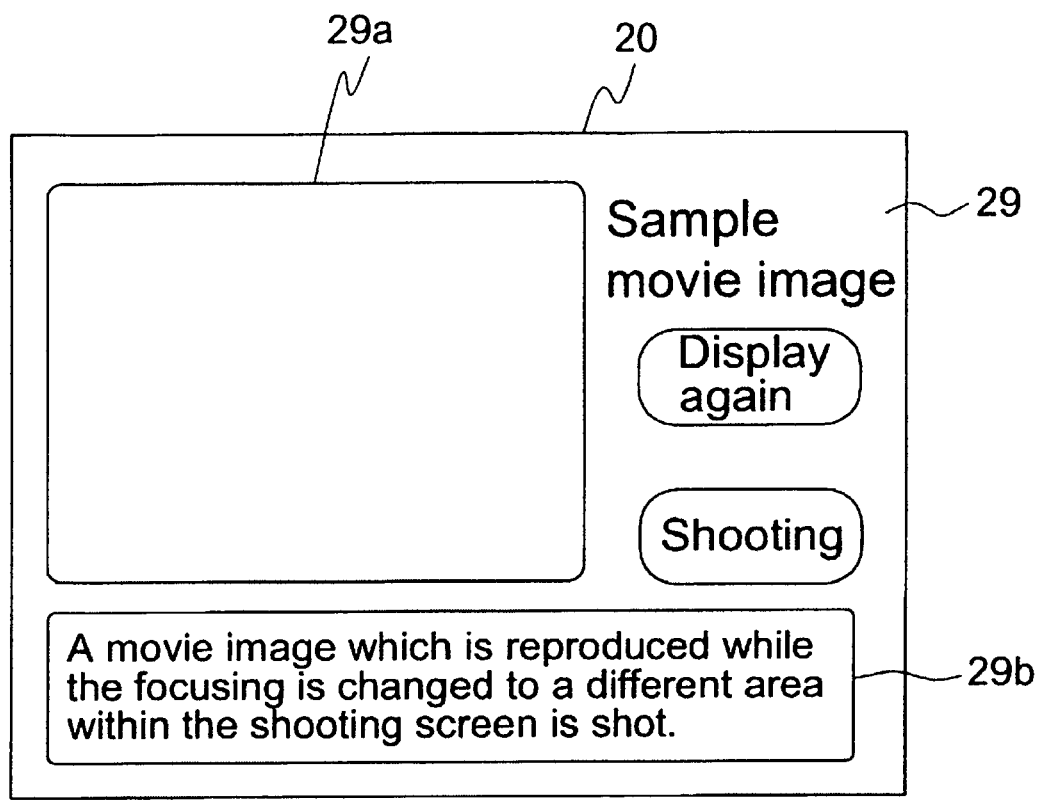
FIG. 5 is a diagram showing a display example of the display unit according to the embodiment.

If the user uses the cross key or the like to select "Yes" and presses the OK button, the control unit 10 displays a screen 29 on the display unit 20, for example as shown in FIG. 5, for the purpose of displaying the sample movie image (the display switches from FIG. 4 to FIG. 5). A sample movie image display area 29a for displaying the sample movie image, a message display area 29b in which simple descriptive text (in FIG. 5, "A movie image which is reproduced while the focusing is changed to a different area within the shooting screen is shot") is displayed in order to describe the selected scenario movie image shooting mode B, and icons for selecting displaying the sample movie image again or moving to movie image shooting (in FIG. 5, "Display Again" and "Shooting") are respectively displayed on the screen 29. Next, the control unit 10 displays a sample movie image in the scenario movie image shooting mode B in the sample movie image display area 29*a*.

It is to be noted that the scenario movie image shooting modes includes not only the mode for shooting a movie image in the manner set forth in the descriptive text in FIG. 5, but also movie image shooting modes (other scenario movie image shooting modes A and C through E) in which the movie image is reproduced and displayed according to scenarios different from each other in each mode and which provide various video effects, e.g., a mode for shooting a movie image that is reproduced slowly when a moving subject approaches and a mode for shooting a movie image while simultaneously changing the focus condition and the zoom condition.

If the user selects "Display Again," using the cross key or the like, and presses the OK button, the control unit 10 once again displays the sample movie image corresponding to the scenario movie image shooting mode B in the sample movie image display area 29*a* on the screen 29 shown in FIG. 5. Meanwhile, if the user selects "No" on the screen 28 shown in FIG. 4, or if the user selects "Shooting" on the screen 29 shown in FIG. 5, the control unit 10 moves to shooting the movie image with scenario movie image shooting mode B, i.e., shooting a movie image which is reproduced while the focusing is changed to a different area in the shooting screen.

Figure 6:
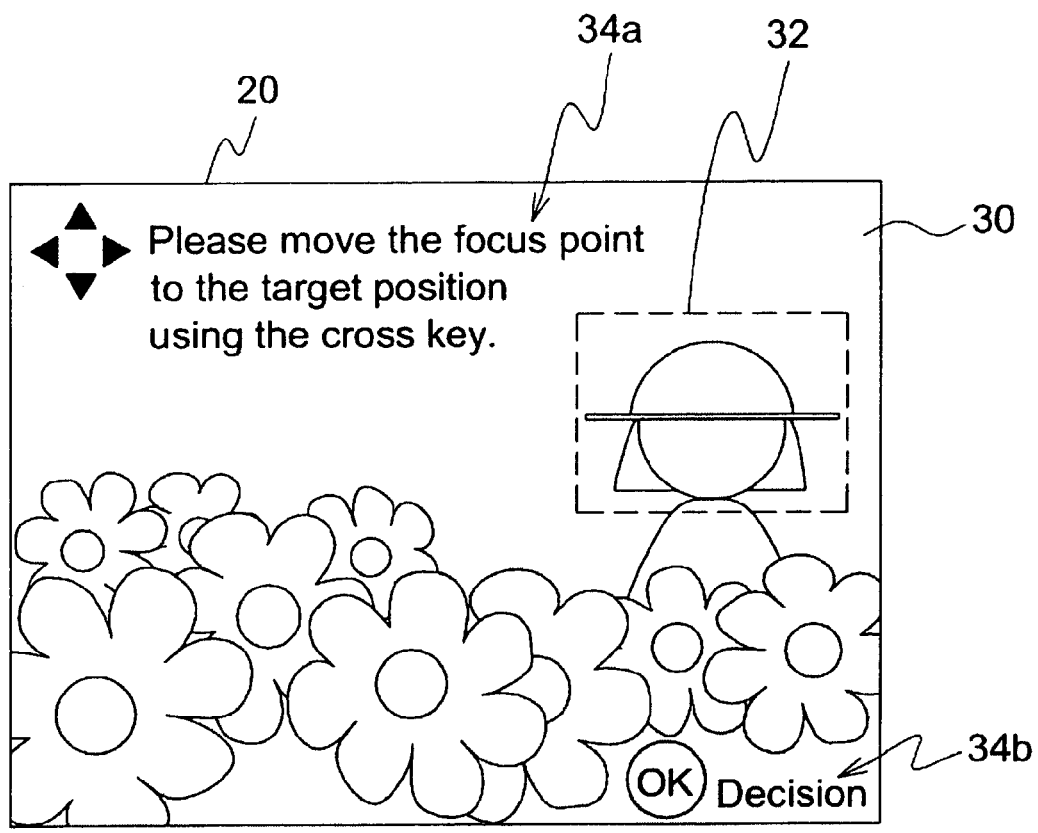
FIG. 6 is a diagram showing a display example of the display unit according to the embodiment.

That is, as shown in FIG. 6, the control unit 10 displays: a through image 30 on the display surface of the display unit 20; a designation frame (a frame indicated by a broken line in FIG. 6) 32 for setting a focus point (hereinafter, referred to as a second focus point) after the movement of the focus (that is, a finally focused target); a message ("Please move the focus point to the target position using the cross key" in FIG. 6) 34*a* for encouraging a user to set the second focus point at the upper portion of the display surface; and a message 34*b* instructing a user to press the OK button after the designation frame 32 is moved to the second focus point at the right lower portion of the display surface, for example. In the description, a user sets the second focus point on the through image 30 displayed on the display surface of the display unit 20, that is, the position of a far subject (a young girl putting on a hat in FIG. 6) relative to the electronic camera 2. Furthermore, when the second focus point (the designation frame 32) is decided and the OK button is pressed by a user, the control unit 10 sets the position of the designation frame 32 as the second focus point (step S10), and stores the second focus point set in step S10 in the storage unit 26 (step S11). At this time, it may also be possible to display a message such as "Target position was stored", for example, at the upper portion of the display surface of the display unit 20.

It is to be noted that when a user moves the designation frame 32 using the cross key, the control unit 10 drives the focusing lens 6 via the lens drive unit 8 with the movement of the designation frame 32 so as to always focus the subject in the designation frame 32, thereby moving the focus position. Alternatively, the focusing lens 6 may not be moved while the designation frame 32 is moved by a user, and may be moved after the designation frame 32 is decided and then the OK button is pressed by a user so as to focus the subject in the designation frame 32.

Figure 7:
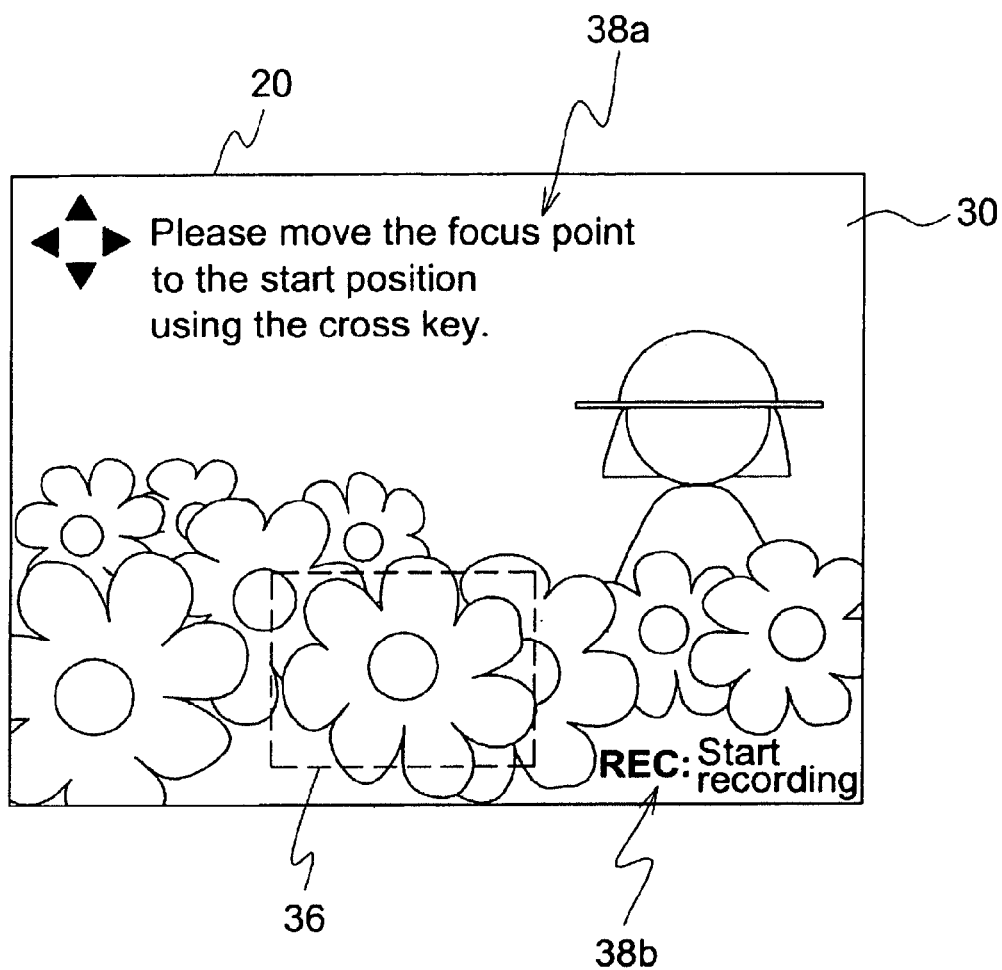
FIG. 7 is a diagram showing a display example of the display unit according to the embodiment.

Next, as shown in FIG. 7, the control unit 10 displays: the through image 30 on the display surface of the display unit 20; a designation frame (a frame indicated by a broken line in FIG. 7) for setting a (initial) focus point before starting the movement of the focus (hereinafter, referred to as a first focus point); a message ("Please move the focus point to the start position using the cross key" in FIG. 7) 38*a* for encouraging a user to set the first focus point, at the upper portion of the display surface; and a message 38*b* instructing a user to press the recording start button (the REC button in FIG. 7) when a movie image starts to be recorded after the first focus point is set, at the right lower portion of the display surface, for example. A user sets the first focus point on the through image 30 displayed on the display surface of the display unit 20, that is, the position of a subject (a flower garden in FIG. 7) near the electronic camera 2.

It is to be noted that similarly to the case where the designation frame 32 shown in FIG. 6 is moved, while the designation frame 36 shown in FIG. 7 is moved, the control unit 10 moves the focusing lens 6 with the movement of the designation frame 36 so as to always focus the subject in the designation frame 36, thereby moving the focus position.

Figure 8:
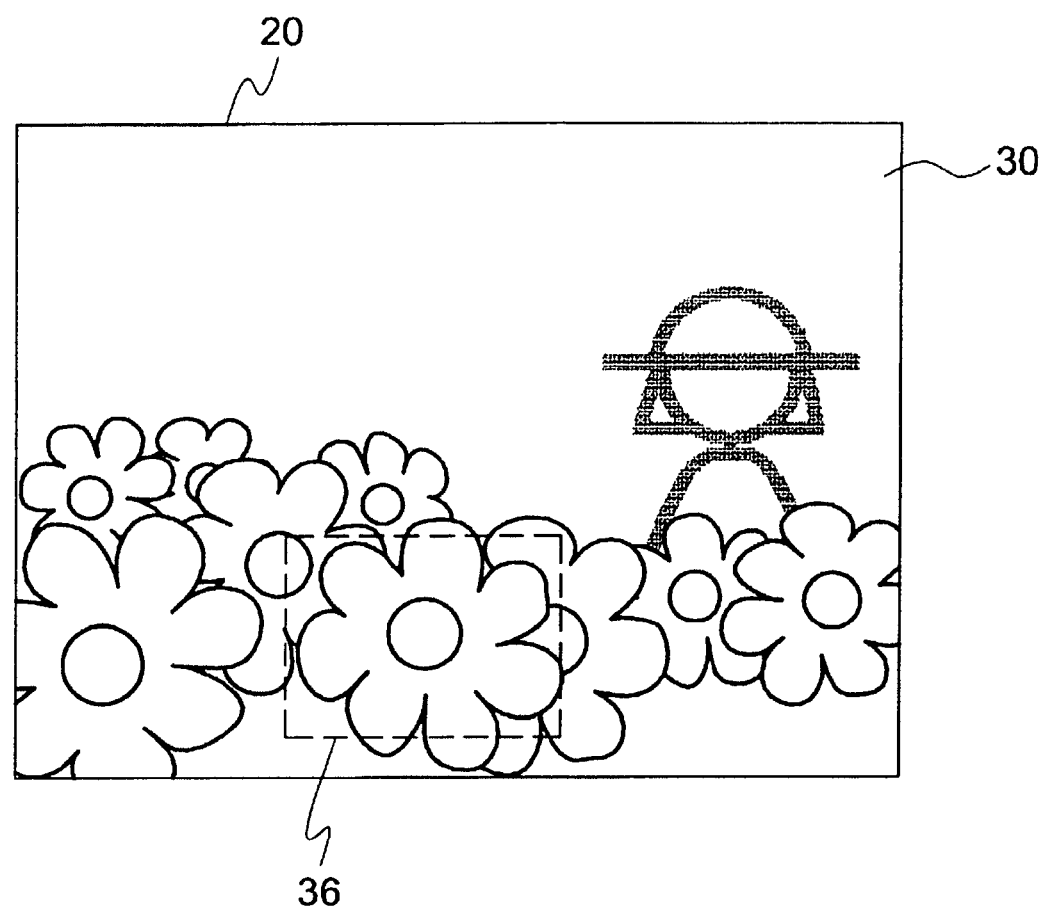
FIG. 8 is a diagram showing a display example of the display unit according to the embodiment.

Subsequently, the control unit 10 determines whether or not the user has pressed the recording start button (in this embodiment, the REC button) (step S12). When it is determined that the recording start button has been pressed in step S12 (Yes in step S12), the control unit 10 sets the position of the designation frame 36 as the first focus point (step S13) and starts to record the movie image and audio (step S14). That is, as shown in FIG. 8, the control unit 10 starts to record the movie image in the state where the focus position is adjusted to the flower garden as the subject in the designation frame 36, and simultaneously starts to record the surrounding audio of the electronic camera 2.

Next, when a start timing at which the movement of the focus position is started is reached (Yes in step S15), the control unit 10 starts the movement of the focus position. It is to be noted that the start timing is set in advance and stored in a memory (not shown) or the like. In this embodiment, the movement of the focus position is set in advance to start two seconds after starting recording the movie image.

Then, the control unit 10 gradually moves the focus position from the first focus point to the second focus point (from the flower garden in the designation frame 36 to the young girl in the designation frame 32) over a predetermined time by driving the focusing lens 6 (step S16). It is to be noted that the predetermined time is set in advance and stored in a memory (not shown) or the like. In this embodiment, the predetermined time is set to two seconds. Furthermore, the focus position may also linearly change in the predetermined time, or non-linearly change like an S-shaped characteristic curve. In this embodiment, the focus position is set to change to draw an S-shaped curve.

Figure 9:
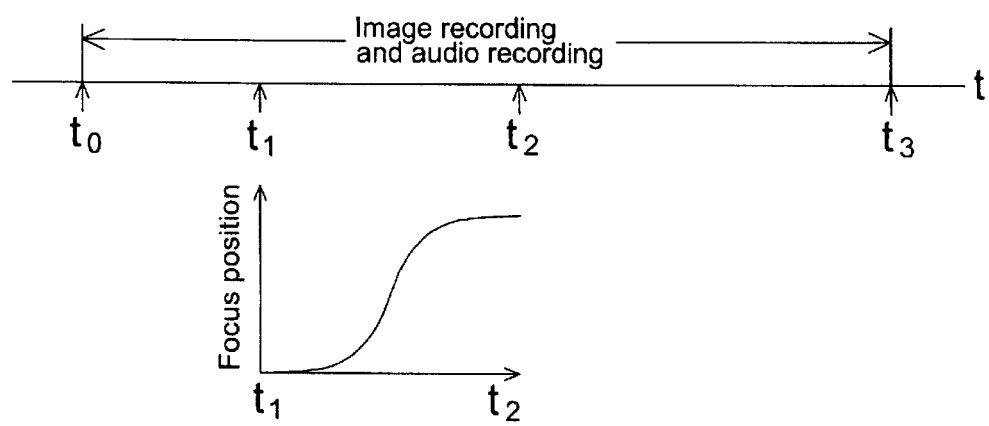
FIG. 9 is a graph showing a time chart from a start of recording a movie image to an end and a change state of a focus position.
Figure 10:
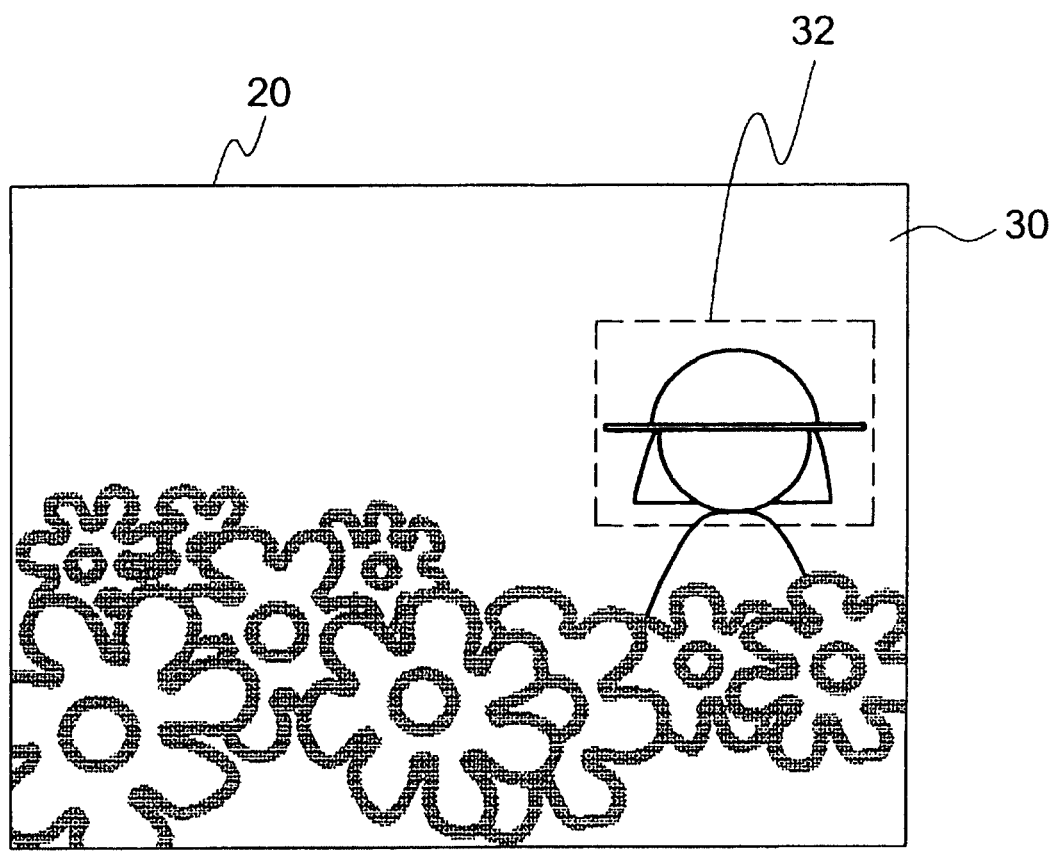
FIG. 10 is a diagram showing a display example of the display unit according to the embodiment.

That is, as shown in the time chart of FIG. 9, when image recording and audio recording start fruit time t0, a movie image focused on the flower garden is recorded from time t0 to time t1 (for two seconds in this embodiment), and a movie image having the focus position gradually-moved from the flower garden to the young girl is recorded from time t1 to time t2 (for two seconds in this embodiment). At this time, as shown in the graph of FIG. 9, the focus position is non-linearly changed to draw an S-shaped curve from time t1 to time t2. As a result, after time t2 onward, a movie image in the state of being focused on the young girl in the designation frame 32 is recorded as shown in FIG. 10.

Next, the control unit 10 determines whether or not an available recording time has elapsed (step S17). The available recording time is the maximum time for recording one movie image with audio, which is set in advance based upon the capacity or the like of the recording medium 18, and stored in a memory (not shown) or the like. In this embodiment, the available recording time is set to 15 seconds. When it is determined that the available recording time, that is, 15 seconds have not elapsed from time t0 in step S17 (No in step S17), the control unit 10 determines whether or not the user has pressed the recording end button (the REC button in this embodiment) (step S18). If it is determined that the recording end button is not pressed in step S18 (No in step S18), the control unit 10 returns to the processing in step S17 and repeats the processing in steps S17 and S18.

Meanwhile, if it is determined that the available recording time has elapsed in step S17 (Yes in step S17) or if it is determined that the recording end button has been pressed in step S18 (Yes in step S18), the control unit 10 ends the recording of the movie image and the audio (step S19). That is, as shown in the time chart of FIG. 9, when time t3 is the time at which the available recording time elapses or the timing at which a user presses the recording end button, the control unit 10 ends the recording of the movie image and the recording of the audio at time t3 in a state being focused on the young girl in the designation frame 32 shown in FIG. 10, which is continued from time t2.

Then, the control unit 10 creates movie image data based upon the movie image (the movie image from time t0 to time t3) including the movie image having the focus position moved form the flower garden to the young girl from time t1 to time t2 based upon the imaging signal from the imaging sensor 12, and creates audio data based upon the audio from time t0 to time t3 based upon the digital audio signal from the microphone 16 via the amplifier and A/D conversion unit 14 (step S20). Then, the control unit 10 records the created movie image data and audio data on the recording medium 18 (step S20). At this time, prior to the recording to the recording medium 18, a message confirming recording to the recording medium 18 such as, "OK to record?" and selection options for selecting whether or not to record to the recording medium 18, such as, "Yes/No" may be displayed.

In the electronic camera 2 according to the first embodiment, it is possible to easily create the movie image data including the movie image with a change in the focus position. According to the conventional technology, when a movie image with a gradual change in the focus position is shot, a high level of operational skill is required. However, in the electronic camera 2 according to the first embodiment, a focus point before the movement and a focus point after the movement are set in advance, so that it is possible to easily create a movie image with a change in the focus position, that is, a movie image having an impressive video effect even without a high level of operational skill.

It is to be noted that according to the first embodiment, the movement of the focus position automatically starts when time t2 (the preset start timing) is reached. However, an instruction button (for example, a shutter button, a REC button and an OK button) for instructing the start of the movement of the focus position is provided, so that the movement of the focus position may start after the instruction button is pressed by a user. In such a case, since the movement of the focus position starts by the instruction of the user, when the user wishes to move the focus position, for example, when a change has occurred in a subject and the like, it is possible to start the movement of the focus position.

Moreover, according to the first embodiment, the start timing of the movement of the focus position is set in advance, however, the preset start timing can be used as a default, and the start timing can be configured to be changed. In such a case, an item for setting the start timing is added to a menu item in a menu for performing various settings of the electronic camera, and a menu screen is displayed on the display unit 20 and operated using the cross key and the like before a movie image with a change in the focus position is recorded, so that the start timing is set.

Hereinafter, with reference to the drawings, an electronic camera according to a second embodiment of the present invention will be described. Since the electronic camera according to the second embodiment has the same configuration as that of the electronic camera 2 according to the first embodiment, detailed description thereof will be omitted and description is made using the identical reference numerals for the configurations that are identical to the configurations.

In the second embodiment, the control unit 10 detects a change in the feature amount of an image in a predetermined area based upon the imaging signal from the imaging sensor 12. The change in the feature amount of the image, for example, includes a change in the brightness or color of an image, a change in histogram, the generation of a motion vector and the like, and can be detected by using a well-known technology. The control unit 10 starts the movement of a focus position from one subject to other subjects different from the subject based upon the change in the feature amount of the image in the predetermined area which is detected when a movie image is recorded.

Figure 2:
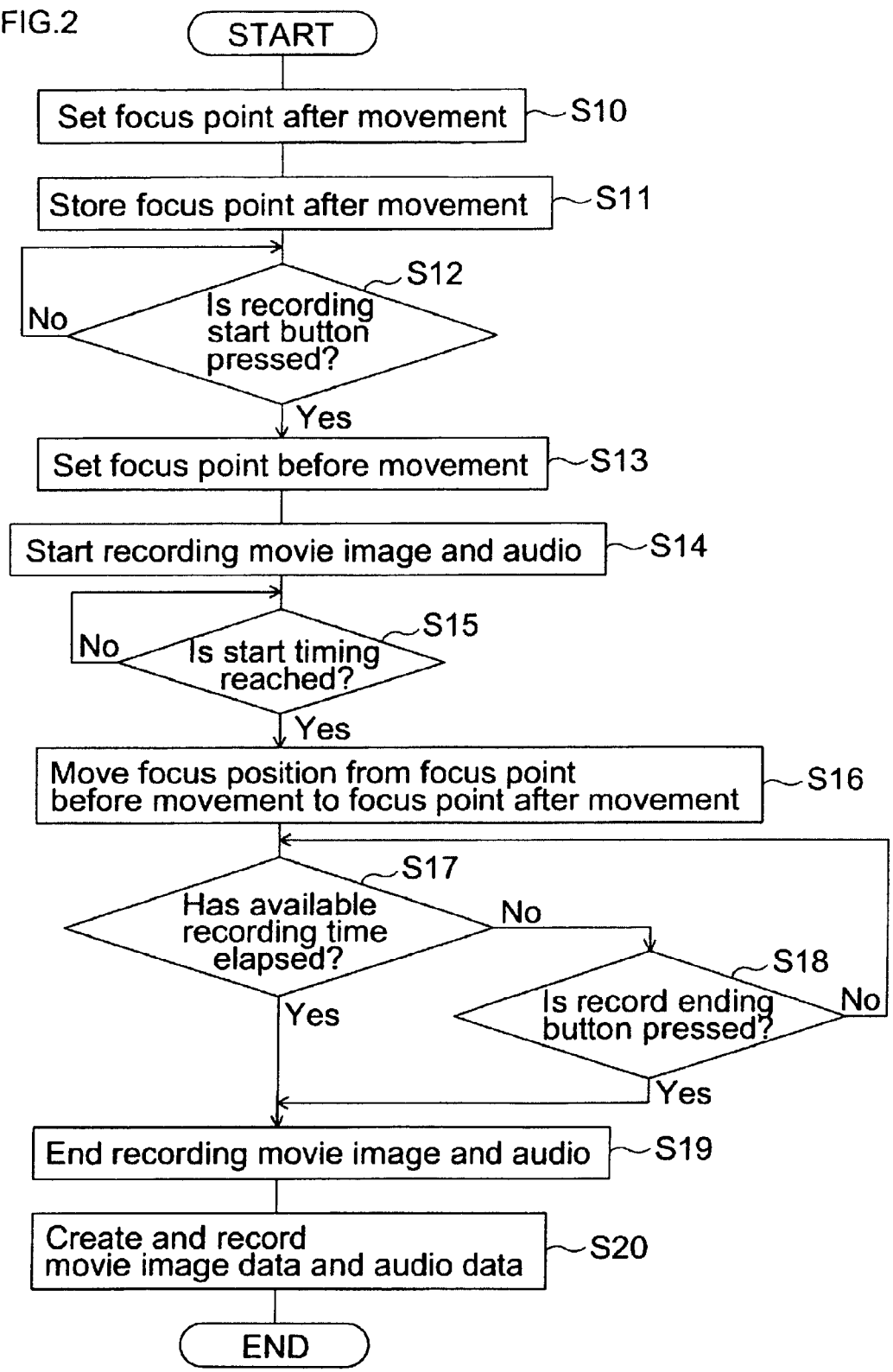
FIG. 2 is a flowchart explaining processing when shooting a movie image in the electronic camera according to the embodiment.
Figure 11:
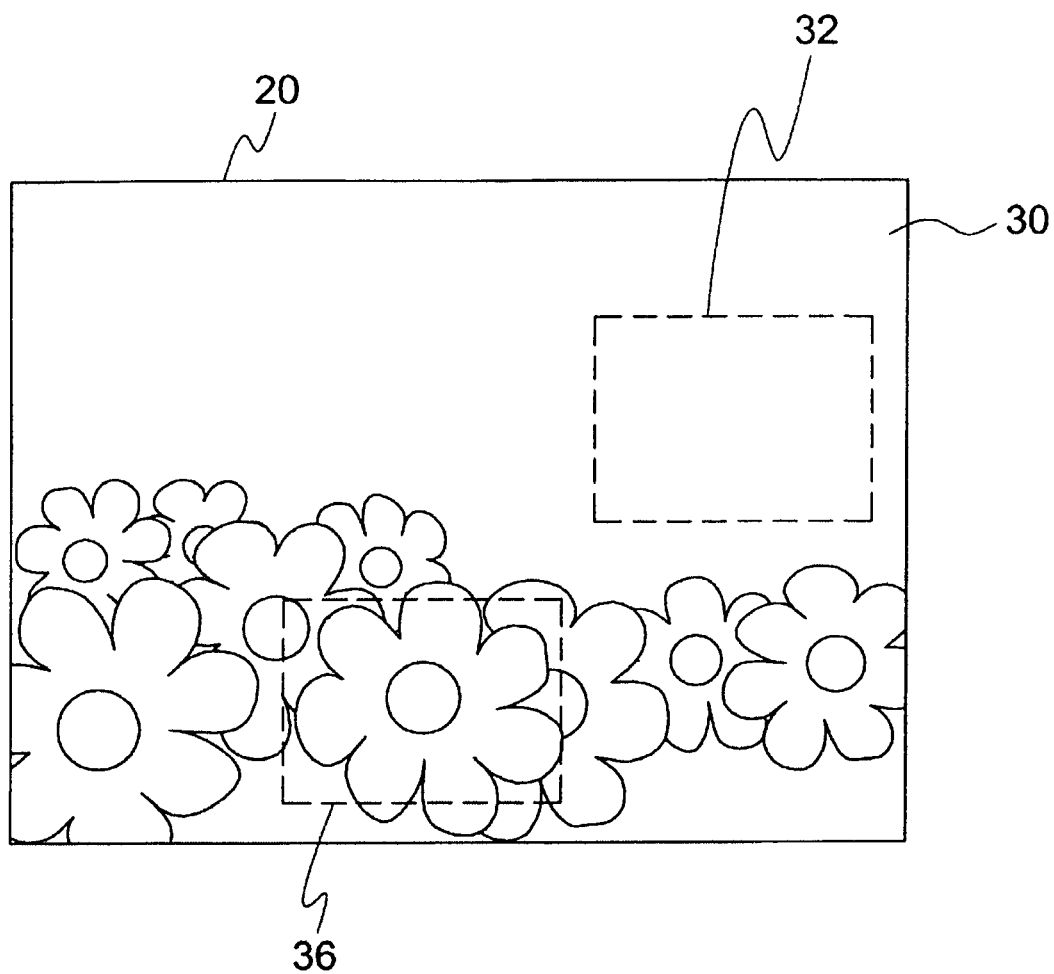
FIG. 11 is a diagram showing a display example of the display unit according to the embodiment.

That is, after completing the processing in steps S10 to S14 shown in FIG. 2, the control unit 10 performs processing for detecting the change in the feature amount of the image in the designation frame 32 and determining whether or not the detected change in the feature amount exceeds a predetermined amount, instead of the processing in step S15 shown in FIG. 2. For example, while a subject does not exist in the designation frame 32 and a movie image is recorded in the state where a focus position is adjusted to a flower garden in the designation frame 36 as shown in FIG. 11, when a young girl moves into the designation frame 32 as shown in FIG. 6, it is determined that the Change has occurred in the feature amount of the image in the designation frame 32.

It is to be noted that the predetermined amount is set in advance and stored in a memory (not shown) or the like. In this embodiment, at the time point at which the change has occurred in the feature amount of the image in the designation frame 32, i.e., at the time point at which the young girl has appeared in any part of the designation frame 32, it is determined that the change in the feature amount of the image in the designation frame 32 exceeds the predetermined amount. When it is determined that the detected change in the feature amount exceeds the predetermined amount, the control unit 10 performs the processing in steps S16 to S20 shown in FIG. 2. That is, the control unit 10 sets the time point at which the change has occurred in the feature amount of the image in the designation frame 32 as the start timing of the movement of the focus position, and gradually moves the focus position from the first focus point to the second focus point over a predetermined time (step S16).

Hereinafter, with reference to the drawings, a modified example of the above-described second embodiment will be described. In the modified example, the control unit 10 detects the face area of a person on the through image 30 as a change in the feature amount of an image in a predetermined area, and detects a change in an overlapping area in which the detected face area overlaps the predetermined area.

Figure 12:
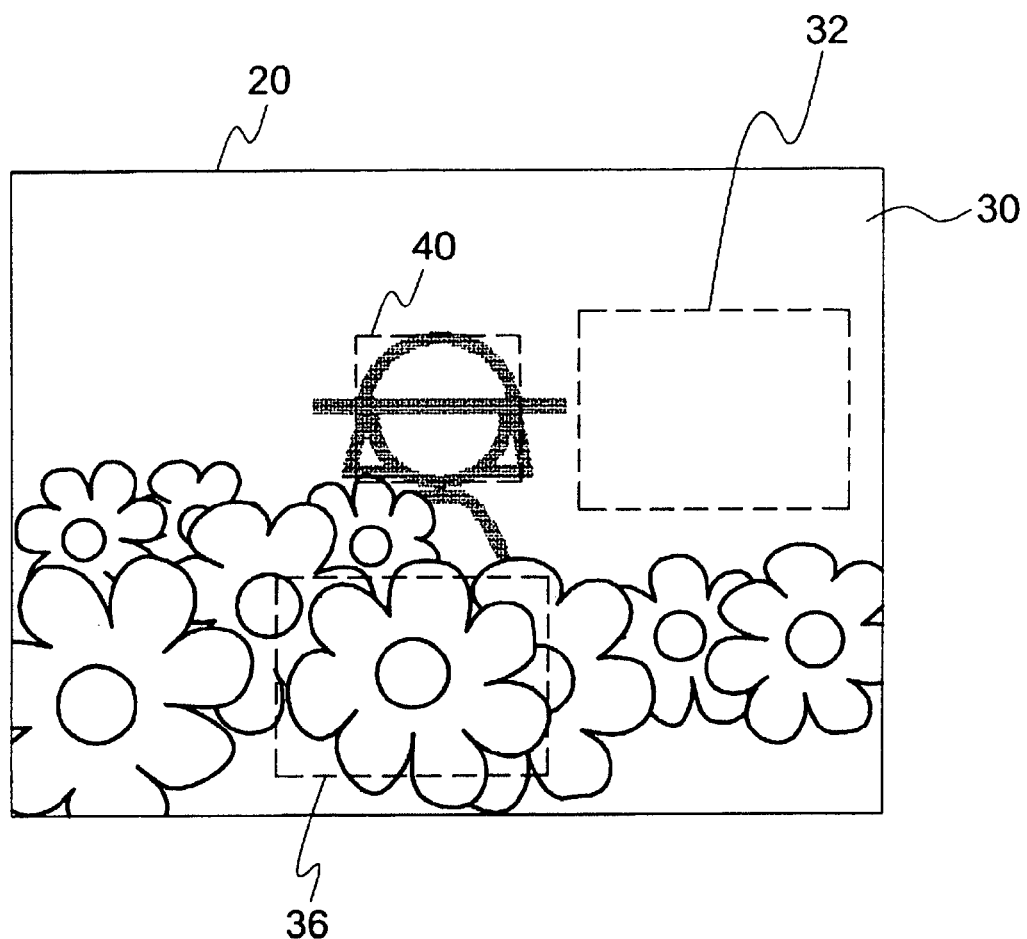
FIG. 12 is a diagram showing a display example of the display unit according to the embodiment.
Figure 13:
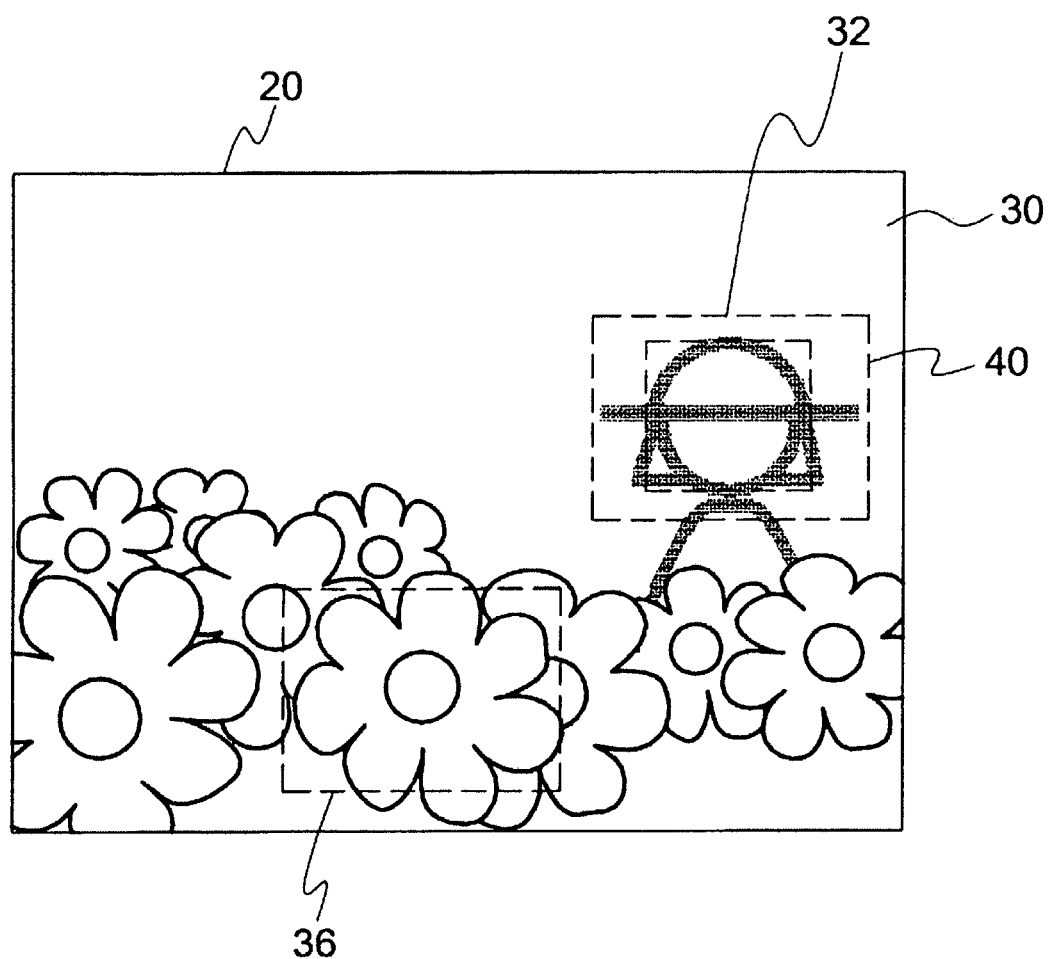
FIG. 13 is a diagram showing a display example of the display unit according to the embodiment.

That is, after completing the processing in steps S10 to S14 shown in FIG. 2, firstly, the control unit 10 detects the face area 40 of a person (a young girl) on the through image 30 as shown in FIG. 12, instead of the processing in step S15 shown in FIG. 2. Next, the control unit 10 detects an overlapping area in which the face area 40 overlaps the designation frame 32, in detail, the overlap ratio of the face area 40 with respect to the designation frame 32. In FIG. 12, since the face area 40 does not overlap the designation frame 32, the overlap ratio is 0%. Then, the control unit 10 determines whether or not the overlap ratio exceeds a predetermined ratio. For example, while the overlap ratio is 0% and a movie image is recorded in the state where the focus position is adjusted to the flower garden in the designation frame 36 as shown in FIG. 12, when it is determined that the overlap ratio of the face area 40 with respect to the designation frame 32 exceeds the predetermined ratio with the movement of the young girl as shown in FIG. 13, the control unit 10 determines that the change has occurred in the feature amount of the image in the designation frame 32.

It is to be noted that the predetermined ratio is set in advance and stored in a memory (not shown) or the like. Moreover, the predetermined ratio can be arbitrarily set by operating a menu screen and the like displayed on the display unit 20 by using a cross key and the like. In this example, the predetermined ratio is set to the ratio (e.g., 80%) where the eyes, nose and mouth of the young girl is occupied in the designation frame 32.

When it is determined that the change has occurred in the feature amount of the image in the designation frame 32, the control unit 10 performs the processing in steps S16 to S20 shown in FIG. 2. That is, the control unit 10 sets the time point at which the change has occurred in the feature amount of the image in the designation frame 32 as the start timing of the movement of the focus position, and gradually moves the focus position from the first focus point to the second focus point over a predetermined time (step S16).

In the electronic camera according to the second embodiment, in addition to the effects of the electronic camera 2 according to the first embodiment, the start timing of the movement of the focus position can be controlled based upon the change in the feature amount of the image in the designation frame 32. That is, for example, when a subject has moved into the designation frame 32, it is possible for a user to start the movement of the focus position without missing the timing at which the user desires to start the movement of the focus position.

Next, with reference to the drawings, an electronic camera according to a third embodiment of the present invention will be described. Since the electronic camera according to the third embodiment has the same configuration as that of the electronic camera 2 according to the first embodiment, detailed description thereof will be omitted and description is made by using the identical reference numerals for the configurations that are identical to the configurations.

According to the third embodiment, when camera shaking occurs while a movie image is shooting, the control unit 10 performs electronic image stabilizing and corrects the position of a predetermined area (at least one of the designation frame 32 and the designation frame 36) with respect to the through image 30 based upon the correction amount of the electronic image stabilizing. Furthermore, similarly to the electronic camera 2 according to the second embodiment, the control unit 10 detects a change in the feature amount of an image in the predetermined area and starts the movement of a focus position from one subject to other subjects different from the subject based upon the detection result.

Figure 14:
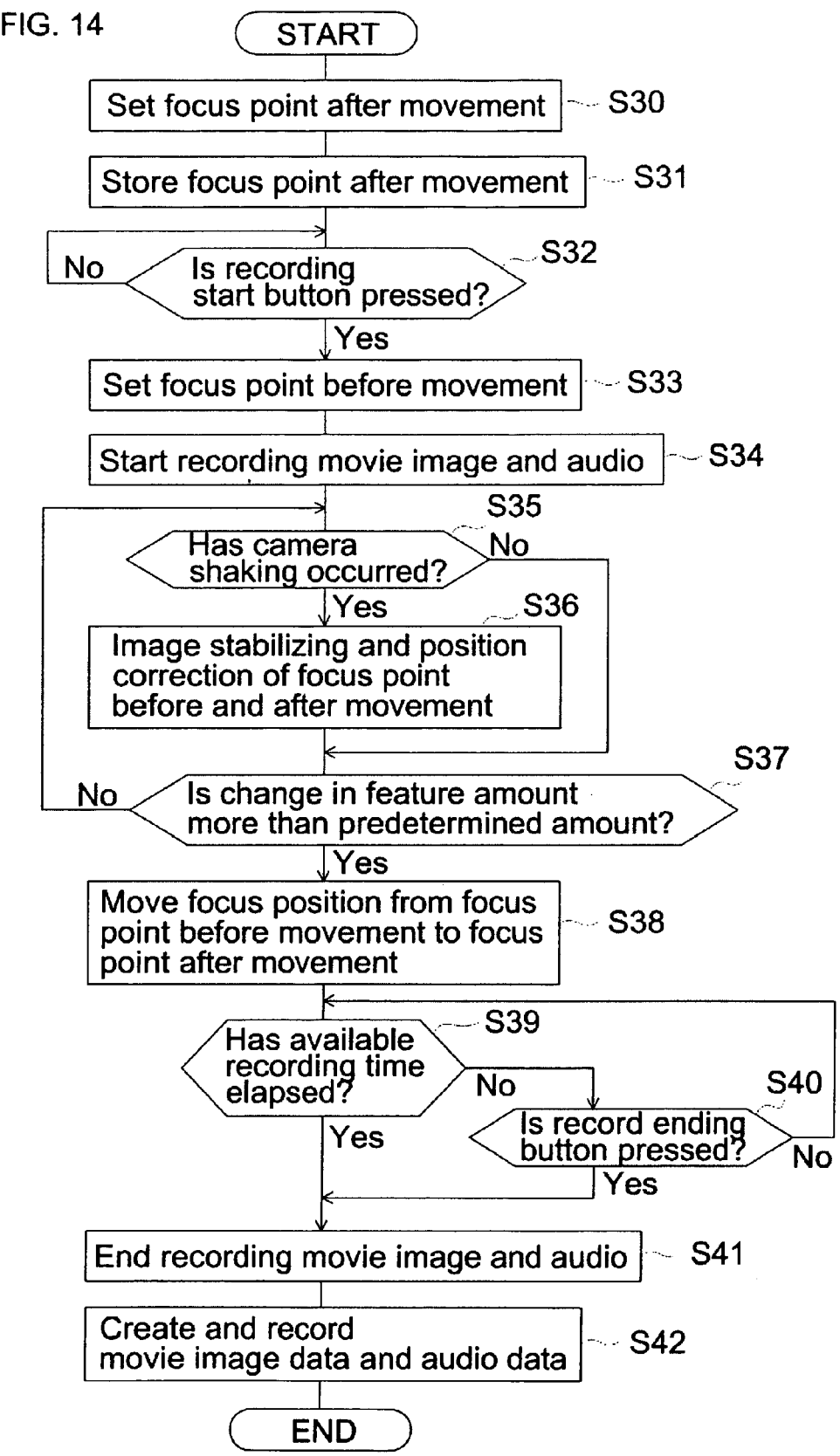
FIG. 14 is a flowchart explaining processing when shooting a movie image in the electronic camera according to an embodiment.

Hereinafter, with reference to a flowchart shown in FIG. 14, description is given of the processing when shooting the above-described movie image with the electronic camera 2 according to the third embodiment. It is to be noted that since the processing of steps S30 to S34 shown in FIG. 14 are substantially identical to the processing in steps S10 to S14 shown in FIG. 2, detailed description thereof will be omitted.

After completing the processing in steps S30 to S34, the control unit 10 determines whether or not camera shaking has occurred based upon a detection result by a camera shake detection unit (not shown) capable of detecting the presence or absence of camera shaking by using a well-known camera shake detection technology (step S35). When it is determined that the camera shaking has occurred in step S35 (Yes in step S35), the control unit 10 performs the electronic image stabilizing based upon the detection result by the camera shake detection unit, and corrects the position of a focus point before and after movement (step S36).

Figure 15:
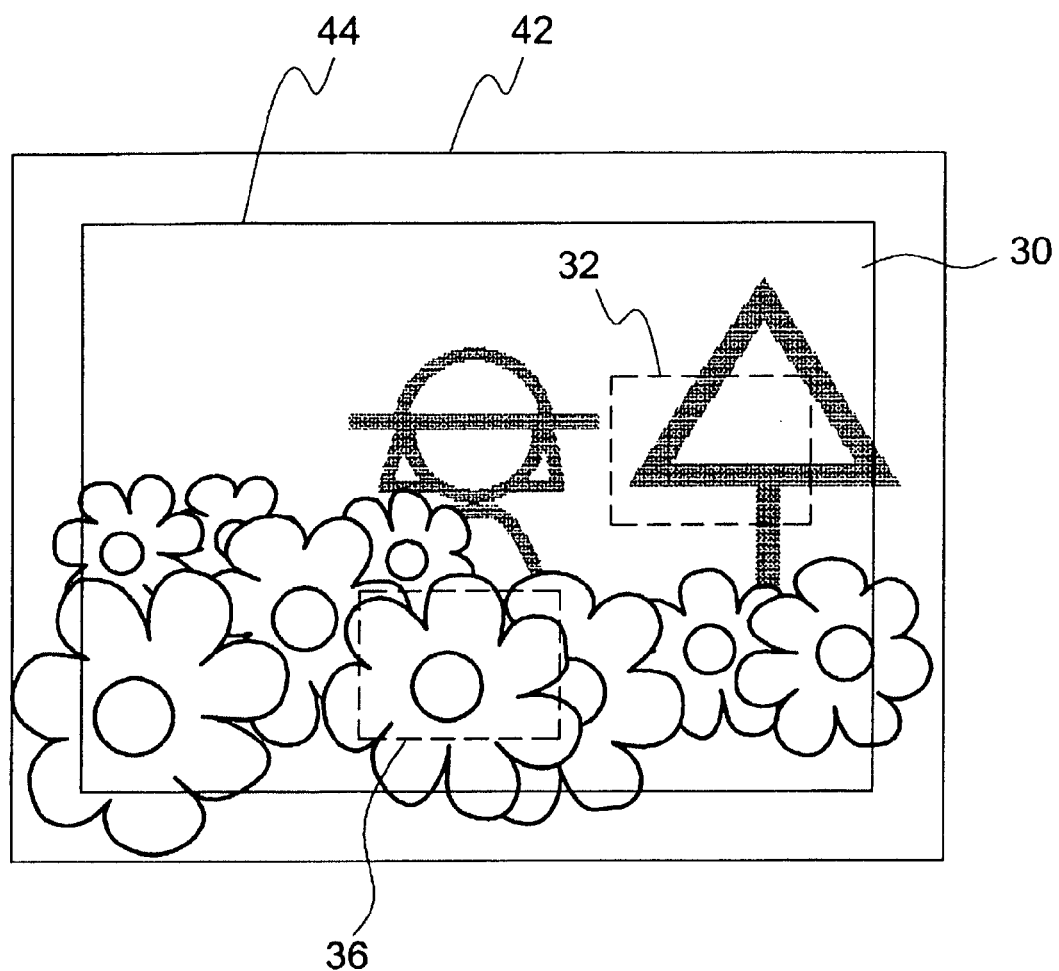
FIG. 15 is a diagram showing a positional relationship among an area readable by an imaging sensor, an area cut as a through image, and a designation frame.
Figure 16:
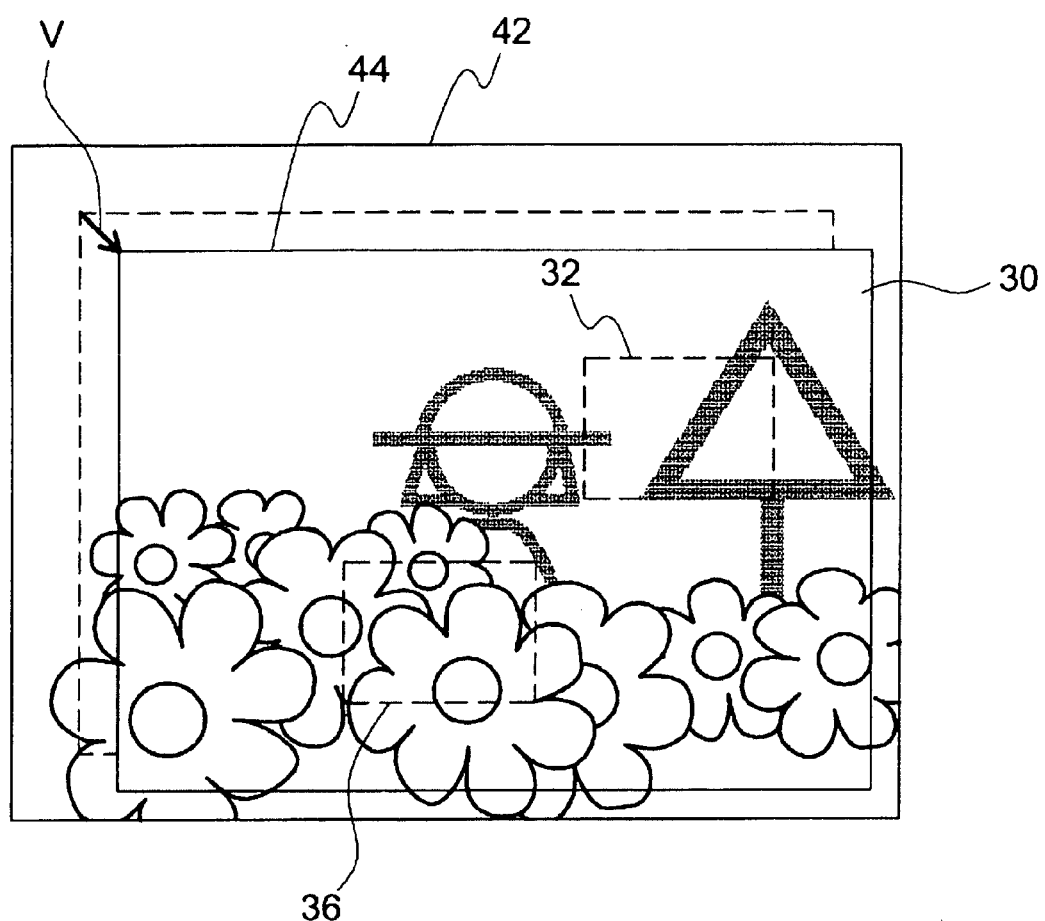
FIG. 16 is a diagram showing a positional relationship among the area readable by the imaging sensor, the area cut as the through image, and the designation frame.
Figure 17:
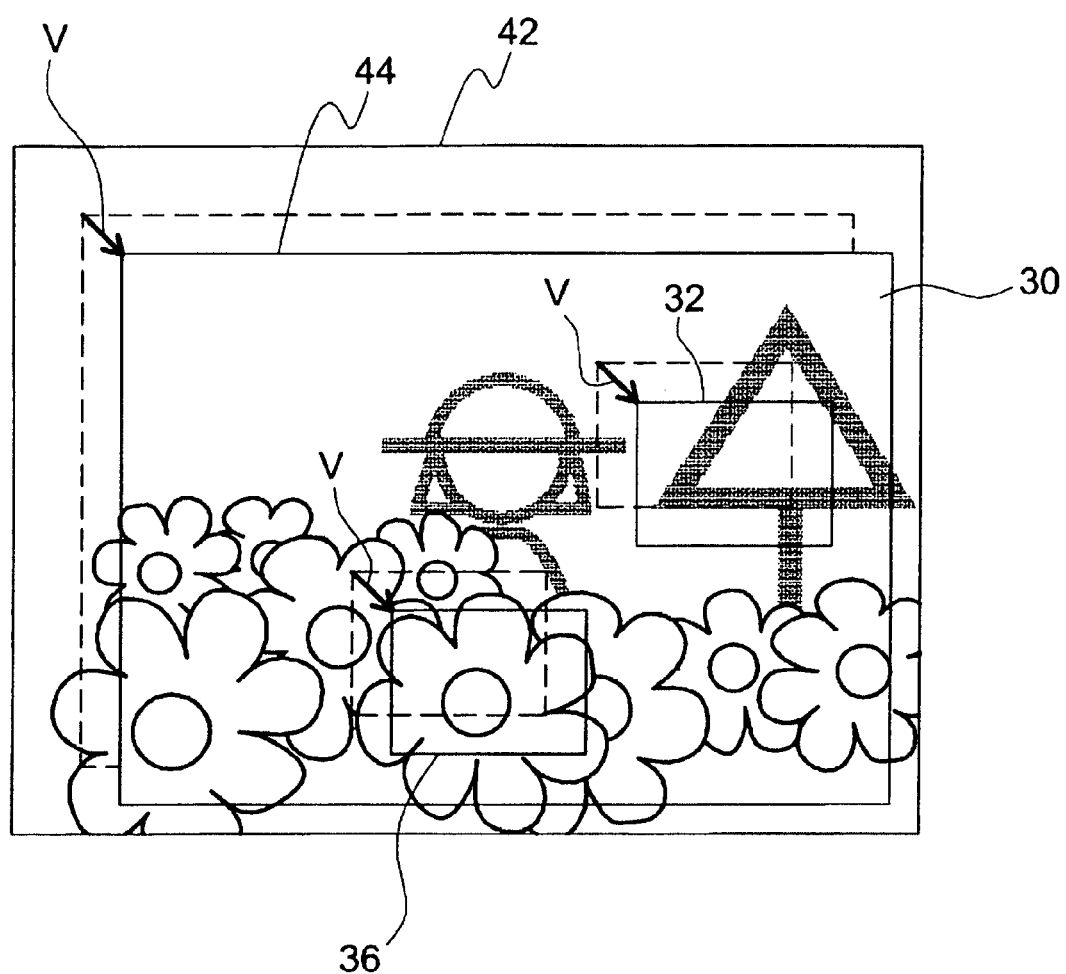
FIG. 17 is a diagram showing a positional relationship among the area readable by the imaging sensor, the area cut as the through image, and the designation frame.

FIG. 15 is a diagram showing the positional relationship in an area 42 readable by the imaging sensor 12 in the state where no camera shaking has occurred and an area 44 cut as the through image 30, and FIG. 16 is a diagram showing the positional relationship in the area 42 readable by the imaging sensor 12 in the state where camera shaking has occurred, for example, in the oblique direction of the FIG. 15 and the area 44 cut as the through image 30. The position of the area 44 cut as the through image 30 with respect to the area 42 is at the approximately center as shown in FIG. 15 when no camera shaking has occurred. On the other hand, when the camera shaking has occurred, the area 44 is moved in the camera shake direction and by the camera shake amount (arrow V shown in FIG. 16) as shown in FIG. 16, so that image stabilizing is performed. That is, even when the camera shaking has occurred, the area 44 cut from the area 42 readable by the imaging sensor 12 is changed in order to prevent a change in the through image 30 based upon the imaging signal by the imaging sensor 12. Furthermore, since the positions of the designation frame 32 serving as the focus point after the movement and the designation frame 36 serving as the focus point before the movement with respect to the area 42 are designated with respect to the area 42 in steps S30 and S33, the positions are not changed before and after the image stabilizing. Thus, in order to prevent a change of the feature amount in the designation frame 32 and the movement of the focus position from starting through the image stabilizing, the positions of the designation frames 32 and 36 with respect to the area 42 are corrected by moving the designation frames 32 and 36 in the camera shake direction and by the camera shake amount (arrow V shown in FIG. 16) as shown in FIG. 17 simultaneously to the image stabilizing or immediately after the image stabilizing. It is to be noted that since the display unit 20 always displays the through image 30 in the image-stabilized area 44 and the position-corrected designation frames 32 and 36, no change occurs in the through image 30 and the designation frames 32 and 36 which are displayed on the display unit 20. Meanwhile, when it is determined that no camera shaking has occurred in step S35 (No in step S35), the control unit 10 proceeds to the processing in step S37 without performing the processing in step S36.

Next, similarly to the second embodiment, the control unit 10 detects a change in the feature amount of the image in the designation frame 32 and determines whether or not the detected change in the feature amount exceeds a predetermined amount (step S37). Alternatively, similarly to the modified example of the second embodiment, the control unit 10 performs processing for detecting a change in an overlapping area in which the face area of a person overlaps the designation frame 32 on the through image 30 as the change in the feature amount of the image in the designation frame 32, and determining whether or not the detected change in the feature amount exceeds the predetermined amount (step S37).

When it is determined that the change in the feature amount does not exceed the predetermined amount in step S37 (No in step S37), the control unit 10 returns to the processing in step S35 and repeats the processing in steps S35 to S37. Meanwhile, when it is determined that the change in the feature amount exceeds the predetermined amount in step S37 (Yes in step S37), the control unit 10 proceeds to the processing in step S38. It is to be noted that, since the processing in steps S38 to S42 are substantially identical to the processing in steps S16 to S20 shown in FIG. 2, detailed description thereof will be omitted.

In the electronic camera 2 according to the third embodiment, in addition to the effects of the electronic camera 2 according to the first embodiment, since the positions of the designation frames 32 and 36 designated as positions with respect to the area 42 readable by the imaging sensor 12 are corrected by moving the designation frames 32 and 36 in the image stabilizing direction and by the image stabilizing amount when the image stabilizing has been performed, it is possible to prevent the change from occurring in the feature amount in the designation frame 32 and the movement of the focus position from starting by performing the image stabilizing even when it is not the start timing of the movement of the focus position. That is, even when camera shaking has occurred, it is possible for a user to start the movement of the focus position without mistaking the timing at which the user desires to start the movement of the focus position.

It is to be noted that, according to the second and third embodiments as described above, the movement of the focus position starts based upon the change in the feature amount of the image in the designation frame 32 for designating the second focus point. However, the movement of the focus position may also start based upon the change in the feature amount of the image in the designation frame 36 for designating the first focus point. Furthermore, the movement of the focus position may also start, for example, after the change occurs in the feature amount of the image in the designation frame 32 or the designation frame 36. Moreover, according to the third embodiment, the positions of the designation frames 32 and 36 are corrected by moving the designation frames 32 and 36 in the image stabilizing direction and by the image stabilizing amount when the image stabilizing has been performed. However, the following configuration is also possible: when the movement of the focus position starts based upon the change in the feature amount of the image in the designation frame 32, only the position of the designation frame 32 is corrected; and when the movement of the focus position starts based upon the change in the feature amount of the image in the designation frame 36, only the position of the designation frame 36 is corrected.

It is to be noted that according to each of the above-described embodiments, the predetermined time for changing the focus position is set in advance. However, the preset predetermined time can be used as a default, and the predetermined time can be changed. In such a case, an item for setting the predetermined time is added to a menu item in a menu, and a menu screen is displayed on the display unit 20 and operated by using the cross key and the like before a movie image with a change in the focus position is recorded, so that the predetermined time is set.

Moreover, according to each of the above-described embodiments, the first focus point is set after the second focus point is set. However, the second focus point may also be set after the first focus point is set. In such a case, after a user gives an instruction for the start of recording, the control unit 10 moves the focus position to the first focus point (the flower garden in the designation frame 36) by driving the focusing lens 6, thereby starting image recording and audio recording. Furthermore, whether the first focus point is initially set or the second focus point is initially set may be set in advance. In such a case, an item for setting the order for setting the focus points is added to a menu item in a menu, and a menu screen is displayed on the display unit 20 and operated by using the cross key and the like before a movie image with a change in the focus position is recorded, so that the order for setting the focus points is set.

Moreover, according to each of the above-described embodiments, as shown in the graph of FIG. 9, the focus position is set in advance to non-linearly change. However, this focus position may be used as a default, and whether the focus position linearly changes or non-linearly changes may also be selected. In such a case, an item for selecting a linear change or a non-linear change is added to a menu item in a menu, and a menu screen is displayed on the display unit 20 and operated by using the cross key and the like before a movie image with a change in the focus position is recorded, so that the linear change or the non-linear change is selected.

It is to be noted that according to each of the above-described embodiments, the two designation frames 32 and 36 are set. However, three or more designation frames can be set. In such a case, for example, firstly, the focus position is moved from a subject in a first designation frame to a subject in a second designation frame, and then from the subject in the second designation frame to a subject in a third designation frame. Furthermore, the size of the designation frames 32 and 36 can be configured to be changed and to be individually set. That is, the size of the designation frame 36 can be set to be different from that of the designation frame 32.

Moreover, according to each of the above-described embodiments, the two designation frames 32 and 36 are set by using the cross key or the OK button. However, the electronic camera 2 includes: a touch panel I/F; and a touch panel connected to the touch panel I/F and provided on a display screen of the display unit 20, and the designation frames 32 and 36 may be set by using this touch panel. In such a case, the control unit 10 recognizes a contact of a user's finger, a pen and the like on the touch panel (the display screen of the display unit 20) via the touch panel I/F, and performs processing based upon the recognition result.

Furthermore, according to each of the above-described embodiments, the movie image having a focus position moved from a near subject to a far subject is recorded. However, a movie image having a focus position moved from a far subject to a near subject can also be recorded.

It is to be noted that according to each of the above-described embodiments, the available recording time is set in advance and image recording is not possible when the available recording time passes. However, image recording and audio recording can be configured to be continued until the recording end button is pressed by a user. Moreover, the preset available recording time can be used as a default and the available recording time can be configured to be changed.

Moreover, according to each of the above-described embodiments, the electronic camera having an auto-focus function based upon a contrast detection system as the detection method of the focus position (the auto-focus function) has been described as an example. However, the present invention is not limited thereto. For example, the present invention can be applied to an electronic camera discussed in Japanese Unexamined Patent Application Publication No. 2009-89144, which performs an auto-focus function by using an imaging sensor 12 where an AF pixel for a divided-pupil phase difference detection system is embedded.

The embodiments explained above have been described so that the present invention is understood more easily, and are not intended to limit the present invention. Therefore, in this meaning, the respective elements, which are discussed in the respective embodiments described above, also include all of modifications of design and equivalents belonging to the technical scope of the present invention.

The invention claimed is:

1. An imaging device comprising:
an imaging sensor that captures subject light via a photographic optical system having a focusing lens;
a display unit that displays a through image based upon an imaging signal from the imaging sensor;
an area setting unit that sets at least two areas on the through image displayed on a display surface of the display unit;
a movement control unit that adjusts a focus position to a subject in one area of the at least two areas set by the area setting unit and moves the focus position from the subject in the one area to a subject in an other area, which is different from the one area, of the at least two areas over a predetermined time by controlling drive of the focusing lens;
a movie image creation unit that creates movie image data from the imaging signal being output from the imaging sensor, the movie image data including a movie image having the focus position moved from the subject in the one area to the subject in the other area by the movement control unit; and
a detection unit that detects a change in a feature amount of an image in at least one of the one area and the other area, wherein
the movement control unit starts the movement of the focus position based upon the change in the feature amount of the image detected by the detection unit.

2. The imaging device according to claim 1, further comprising a face area detection unit that detects a face area of a person on the through image displayed on the display surface of the display unit, wherein
the detection unit detects a change in an overlapping area, in which the face area detected by the face area detection unit overlaps the at least one of the one area and the other area, as the change in the feature amount of the image, and
the movement control unit starts the movement of the focus position based upon the overlapping area detected by the detection unit.

3. The imaging device according to claim 2, further comprising:
an electronic image stabilizing unit that performs image stabilizing electronically; and
a position correction unit that corrects a position of the at least one of the one area and the other area with respect to the through image based upon the image stabilizing performed by the electronic image stabilizing unit, wherein
the detection unit detects the change in the feature amount of the image in the at least one of the one area and the other area which has the position corrected by the position correction unit with respect to the through image.

4. The imaging device according to claim 3, wherein the predetermined time is changeable by a user.

5. The imaging device according to claim 2, wherein the predetermined time is changeable by a user.

6. The imaging device according to claim 1, further comprising:
an electronic image stabilizing unit that performs image stabilizing electronically; and
a position correction unit that corrects a position of the at least one of the one area and the other area with respect to the through image based upon the image stabilizing performed by the electronic image stabilizing unit, wherein
the detection unit detects the change in the feature amount of the image in the at least one of the one area and the other area which has the position corrected by the position correction unit with respect to the through image.

7. The imaging device according to claim 6, wherein the predetermined time is changeable by a user.

8. The imaging device according to claim 1, wherein the predetermined time is changeable by a user.

* * * * *